US011888223B2

(12) United States Patent
Manasson et al.

(10) Patent No.: US 11,888,223 B2
(45) Date of Patent: Jan. 30, 2024

(54) STEERABLE BEAM ANTENNA

(71) Applicant: SIERRA NEVADA CORPORATION, Sparks, NV (US)

(72) Inventors: Vladimir A Manasson, Irvine, CA (US); Lev S. Sadovnik, Irvine, CA (US)

(73) Assignee: Sierra Nevada Corporation, Sparks, NV (US)

( * ) Notice: Subject to any disclaimer, the term of this patent is extended or adjusted under 35 U.S.C. 154(b) by 205 days.

(21) Appl. No.: 17/442,540

(22) PCT Filed: Mar. 31, 2020

(86) PCT No.: PCT/US2020/025968
§ 371 (c)(1),
(2) Date: Sep. 23, 2021

(87) PCT Pub. No.: WO2021/002904
PCT Pub. Date: Jan. 7, 2021

(65) Prior Publication Data

US 2022/0190481 A1 Jun. 16, 2022

Related U.S. Application Data

(60) Provisional application No. 62/827,512, filed on Apr. 1, 2019.

(51) Int. Cl.

| | |
|---|---|
| ***H01Q 3/24*** | (2006.01) |
| ***H01Q 3/34*** | (2006.01) |
| ***H01Q 13/20*** | (2006.01) |

(52) U.S. Cl.
CPC ............ *H01Q 13/20* (2013.01); *H01Q 3/247* (2013.01)

(58) Field of Classification Search
CPC ............ H01Q 13/20; H01Q 3/22; H01Q 3/24; H01Q 3/247; H01Q 3/26; H01Q 3/28;
(Continued)

(56) References Cited

U.S. PATENT DOCUMENTS 6,232,931 B1 * 5/2001 Hart .................... H01Q 15/002 343/788
7,456,787 B2 11/2008 Manasson et al.
(Continued)

OTHER PUBLICATIONS

International Search Report on corresponding PCT application (PCT/US2020/025968) from International Searching Authority (USPTO) dated Jan. 5, 2021.
(Continued)

*Primary Examiner* — Tho G Phan
(74) *Attorney, Agent, or Firm* — Mintz Levin Cohn Ferris Glovsky and Popeo, P.C.

(57) ABSTRACT

A steerable beam antenna includes a plurality of semiconductor chips arranged along a longitudinal axis. Each of the chips has a ground plane on its upper surface, and is doped to form an array of semiconductor switches arranged along the longitudinal axis. A corresponding array of scattering elements, each having a first leg and a second leg, is mounted on each chip along the longitudinal axis. A first electrode of each switch is configured for connection to a control circuit, a second electrode is connected to the ground plane, and a third electrode is connected to the first leg of one of the array of scattering elements, the second leg of which is connected to the ground plane. A dielectric element is mounted on the antenna chips along the longitudinal axis above the arrays of switches and scattering elements and is separated from the scattering elements by an air gap.

13 Claims, 17 Drawing Sheets

(58) Field of Classification Search

CPC ............ H01Q 3/34; H01Q 3/44; H01Q 13/22; H01Q 21/00; H01Q 21/0087; H01Q 21/0093; H01Q 21/06; H01Q 21/061; H01Q 23/00

See application file for complete search history.

(56) References Cited

U.S. PATENT DOCUMENTS

| | | | | |
|---|---|---|---|---|
| 7,609,223 | B2 | 10/2009 | Manasson et al. | |
| 7,777,286 | B2 | 8/2010 | Manasson et al. | |
| 7,864,112 | B2 | 1/2011 | Manasson et al. | |
| 7,995,000 | B2 | 8/2011 | Manasson et al. | |
| 8,456,360 | B2 | 6/2013 | Manasson et al. | |
| 9,583,830 | B2 * | 2/2017 | Stambovsky | H01Q 9/14 |
| 9,698,478 | B2 * | 7/2017 | Manasson | H01Q 3/24 |
| 9,853,361 | B2 | 12/2017 | Chen | |
| 10,283,861 | B2 * | 5/2019 | Derneryd | H04B 7/0608 |
| 10,910,708 | B2 * | 2/2021 | Chen | H01Q 1/246 |
| 11,121,462 | B2 * | 9/2021 | Palreddy | H01Q 21/061 |
| 2003/0184478 | A1 | 10/2003 | Kingsley et al. | |
| 2006/0244672 | A1 | 11/2006 | Avakian et al. | |
| 2015/0229028 | A1 | 8/2015 | Bily | |
| 2015/0295309 | A1 | 10/2015 | Manry, Jr. et al. | |
| 2015/0357711 | A1 | 12/2015 | Manasson et al. | |
| 2017/0229775 | A1 | 8/2017 | Navarro et al. | |
| 2018/0331041 | A1 | 11/2018 | Liao et al. | |

OTHER PUBLICATIONS

Written Opinion on corresponding PCT application (PCT/US2020/025968) from International Searching Authority (USPTO) dated Jan. 5, 2021.

Supplementary European Search Report dated Dec. 13, 2022 issued in corresponding EP Appln. No. 20834135.4.

* cited by examiner

Biased Electrode 43
(Low Scattering)

Non-Biased Electrode 43
(High Scattering)

STEERABLE BEAM ANTENNA

CROSS-REFERENCE TO RELATED APPLICATION

This application is the national phase entry, under 35 U.S.C. Section 371(c), of International Application No. PCT/US2020/025968, filed Mar. 31, 2020, which claims the benefit, under 35 U.S.C. § 119(e), of U.S. Provisional Application No. 62/827,512; filed Apr. 1, 2019. The disclosures of the aforementioned International Application and US Provisional application are incorporated herein by reference in their entireties.

BACKGROUND

The present disclosure relates to directional or steerable beam antennas, of the type employed in such applications as radar and communications. More specifically, it relates to leaky-waveguide antennas, of the type including a dielectric feed line (i.e., a potentially leaky waveguide) loaded with scatterers, wherein the degree of scattering can be controllably altered by the actuation of a plurality of switches, whereby the antenna's beam shape and direction are determined by the pattern of the switches that are respectively turned on and off.

FEDERALLY SPONSORED RESEARCH OR DEVELOPMENT

Not Applicable.

Steerable beam antennas, particularly leaky-wave antennas, are capable of sending electromagnetic signals in, and receiving electromagnetic signals from, desired directions. Such antennas are used, for example, in various types of radars (e.g., surveillance radar, collision avoidance radar), and in communications. In such antennas, the receiving or transmitting beam is generated by a set of scattering elements ("scatterers") coupled to the feed line or waveguide. Interacting with the feed line, the scatterers create leaky waves decoupled from the feed line. If the scatterers are properly phased, they create a coherent beam propagating in a specific direction. The leakage strength and phase caused by each scatterer depend on the geometry and location of the scatterer relative to the feed line or waveguide. The degree of scattering, and thus the beam shape and direction, can be controlled by changing the topology and/or geometry of the scattering-element current lines. This can be done by using microwave (or other suitable) switches connecting parts of the scatterers. Thus, the beam shape, including its direction, can be controlled electronically by changing the operational mode of the switches. Different ON/OFF switch patterns result in different beam shapes and/or directions.

Any of several types of switches integrated into the structure of the antenna elements or scatterers may be used for this purpose, such as semiconductor switches (e.g., PIN diodes, bipolar and MOSFET transistors, varactors, photodiodes and photo-transistors, semiconductor-plasma switches, phase-change switches), MEMS switches, piezoelectric switches, ferroelectric switches, gas-plasma switches, electromagnetic relays, thermal switches, etc. For example, semiconductor plasma switches have been used in antennas described in U.S. Pat. No. 7,151,499, the disclosure of which is incorporated herein by reference in its entirety. A specific example of an antenna in which the geometry of the scattering elements is controllably varied by semiconductor plasma switches is disclosed U.S. Pat. No. 7,777,286, the disclosure of which is incorporated herein in its entirety. Another example of a currently-available electronically-controlled steerable beam antenna using switchable antenna elements (scatterers) is disclosed in U.S. Pat. No. 7,995,000, the disclosure of which is incorporated herein its entirety.

U.S. Pat. No. 9,698,478, the disclosure of which is incorporated herein by reference in its entirety, is assigned to the assignee of this disclosure. That patent discloses an electronically-controlled steerable beam antenna, of the general type described above, comprising a feed line or transmission line defining an axis x; and first and second arrays of electronically-controlled switchable scatters distributed along the axis x, each of the scatterers in the first and second arrays being switchable between a "high" scattering state and a "low" scattering state to scatter an electromagnetic wave propagating through the feed line so as to form a steerable antenna beam.

More specifically, in the antenna disclosed in the above-mentioned '478 patent, the scatterers of the first array are configured to scatter an electromagnetic wave propagating through the feed line. The high-state scatterers in the first array follow a quasi-periodic pattern with an average period P=nd, where n is the number of scatterers per period (including both low-state scatterers and high-state scatterers), and where d is the spacing between adjacent scatterers along the axis x. The high-state scatterers in the second array follow the similar quasi-periodic pattern, with the same average period P, but the pattern of the second array is shifted along the x axis relative to the pattern of the first array.

The antenna beam direction φ is determined by the average period P and the wave phase propagation speed v in the antenna feed line:

$$\sin\varphi = \frac{c}{v} - \frac{\lambda}{P}$$

where c is the speed of light, and λ is the free-space wavelength of the beam.

One problem in such steerable beam antennas operating in microwave/millimeter wavelengths is that, as the operational frequency increases, on/off switch-impedance contrast degrades, and scatterer losses increase, due to parasitic capacitances and inductances. Thus, while the above-described antenna of the '478 patent achieves its intended results, it is not optimized for operating at higher millimeter-wave frequencies. Therefore, there is a need for an antenna with the same functionality as the antenna disclosed in the '478 patent, but at higher operational frequencies. Furthermore, it would be advantageous for such an antenna to be compatible with microelectronics mass production techniques.

SUMMARY

This disclosure relates to a beam-steering antenna that can be used in areas of imaging radar, communication, concealed weapon detection, landing support devices, collision avoidance systems, etc. More specifically, this disclosure describes a practical implementation of such an antenna that is particularly well-suited to operate at millimeter-wave frequencies and above, although it is not restricted to these frequencies.

In steerable beam antennas in accordance with embodiments of the disclosure, scatterer losses are minimized by providing scatterers that are configured so that they are substantially surrounded by air (a dielectric with minimal dielectric loss), rather than being embedded conductors in a silicon substrate. Furthermore, the scatterer-actuating switches are monolithically integrated into a semiconductor chip as doped regions compactly arranged in the chip, and are directly connected to the antenna scatterers, thereby minimizing switch-scatterer connection losses. In accordance with this disclosure, the switches that actuate the scatterers have three-electrodes configured to allow the switches to operate so as to minimize parasitic influences from the controlling circuit without employing lumped elements that degrade switch operation at high frequencies.

In accordance with aspects of this disclosure, an electronically controlled steerable beam antenna may comprise a base having a planar surface; a plurality of semiconductor antenna chips mounted on the planar surface of the base along a longitudinal axis X; each of the antenna chips defining an upper surface; a ground plane on the upper surface of each of the antenna chips; an array of semiconductor switches arranged longitudinally in each of the antenna chips along the axis X, each of the semiconductor switches comprising a ground electrode, a central electrode, and a control electrode, the control electrode being configured for electrical connection to a control circuit; an array of conductive scattering elements on each of the plurality of antenna chips, wherein each of the conductive scattering elements has a first leg connected to the ground plane and a second leg connected to the central electrode of one of the semiconductor switches; and a linear dielectric element (as a major part of a transmission/feed line) mounted on the plurality of antenna chips along the longitudinal axis X so as to overlie the scattering elements (scatterers), wherein the dielectric element is separated from the array of scattering elements by an air gap.

Other features and aspects of the disclosure will be described in the detailed description below.

BRIEF DESCRIPTION OF THE DRAWINGS

FIG. 11A illustrates an unbiased/biased switch pattern with average period P=7.5, and FIG. 11B illustrates a half-period pattern shift between the array patterns when two mirror-symmetric scatterer arrays are employed.

DETAILED DESCRIPTION

Figure 1:
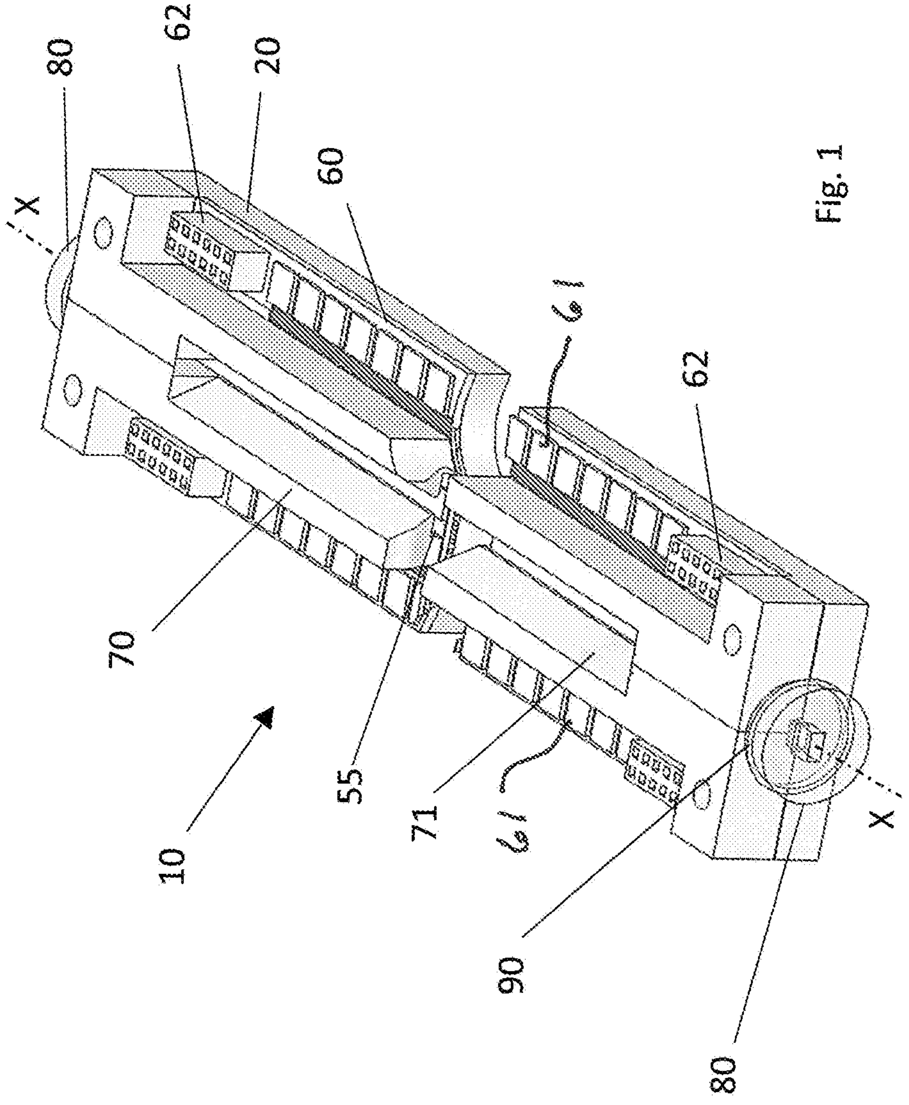
FIG. 1 is a simplified view of an assembled electronically controllable steerable beam antenna in accordance with aspects of this disclosure.
Figure 2:
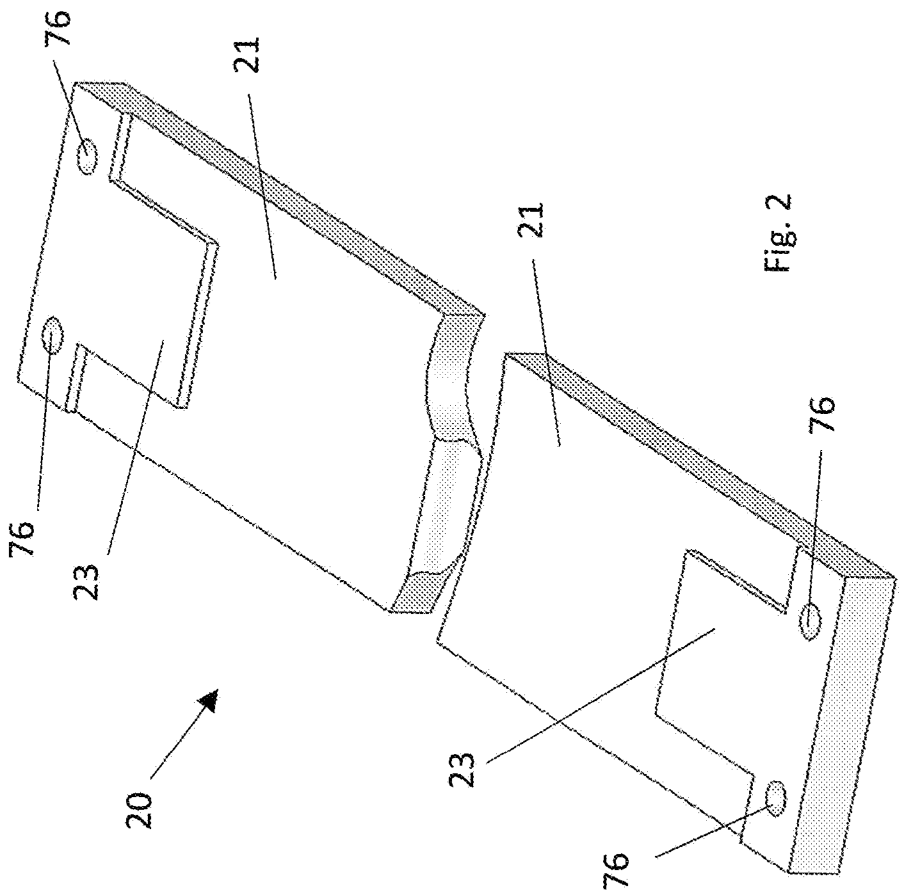
FIG. 2 is a simplified view of a base plate of the antenna of FIG. 1, showing a flat area for accommodating electronic components of the antenna, and elevated platforms configured to support an antenna cover and parts related to an antenna waveguide.
Figure 13:
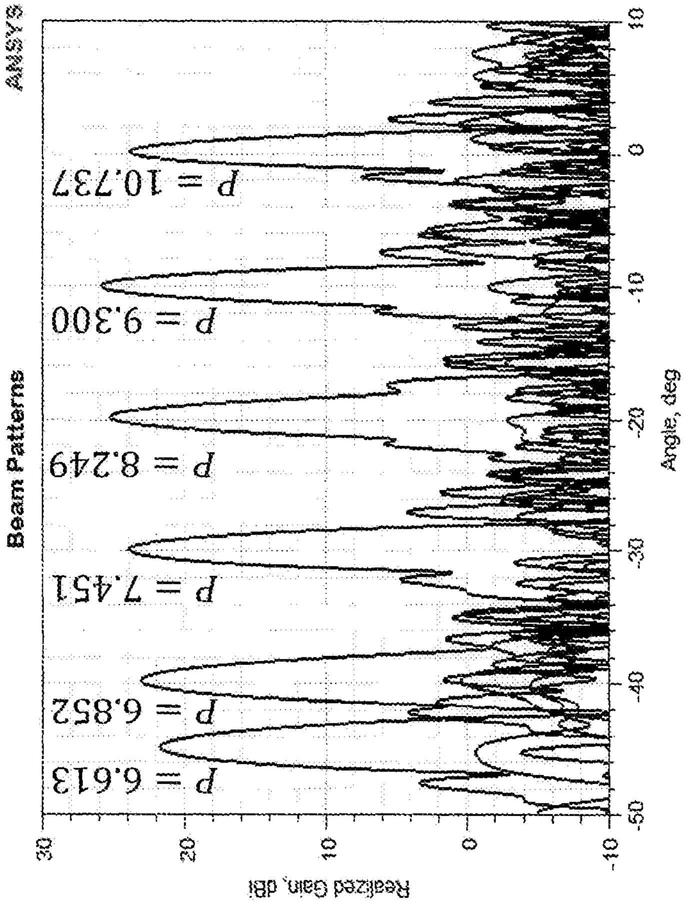
FIG. 13 shows exemplary waveforms of antenna beams formed by the antenna with different biased/unbiased switch pattern average periods $P_\Sigma$.

FIGS. 1-3 show a steerable beam antenna 10 in accordance with exemplary embodiments of this disclosure. The antenna 10 comprises a base 20 made of metal or metallized ceramic (or material with similar mechanical and thermal properties). The base 20 carries all antenna parts, and it may also advantageously serve as a heat sink. If necessary or advantageous, the base 20 may contain heat-dissipation ribs (not shown) on its back side, or coolant channels (not shown) inside its body. A flat central area 21 (FIG. 2) on one major surface (which may be considered the top surface for the purpose of this disclosure) is configured to accommodate a plurality of semiconductor (e.g., silicon) antenna chips 30 (FIG. 3) and one or more control boards 60 on which are mounted a plurality of control circuits 61 (FIG. 1), as will be discussed below. An elevated area or plateau 23 (FIG. 2) is provided adjacent each of the opposite ends of the base 20. The plateaus 23 may advantageously be configured to support an antenna cover 70 (FIG. 1), which may be secured to the base by suitable fasteners (not shown) installed in mounting holes 76 (FIG. 2). As shown in FIGS. 1 and 13, the cover 70 may be formed as two symmetrical longitudinal cover halves, which together form a central wave horn 71, as will be described below.

Figure 3B:
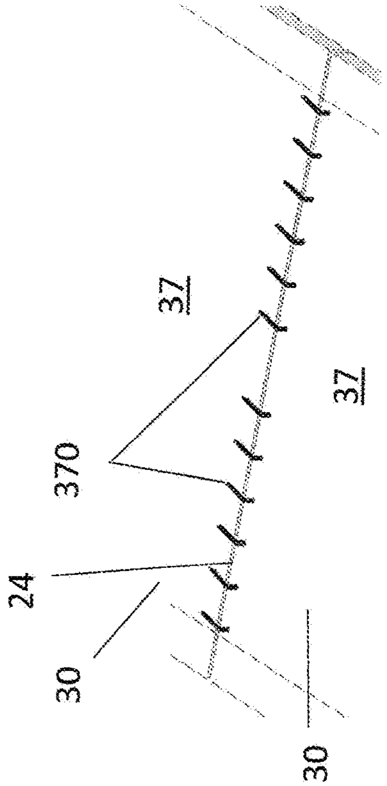
FIG. 3B is a simplified detailed view of the ground plate connections between adjacent antenna chips.
Figure 3A:
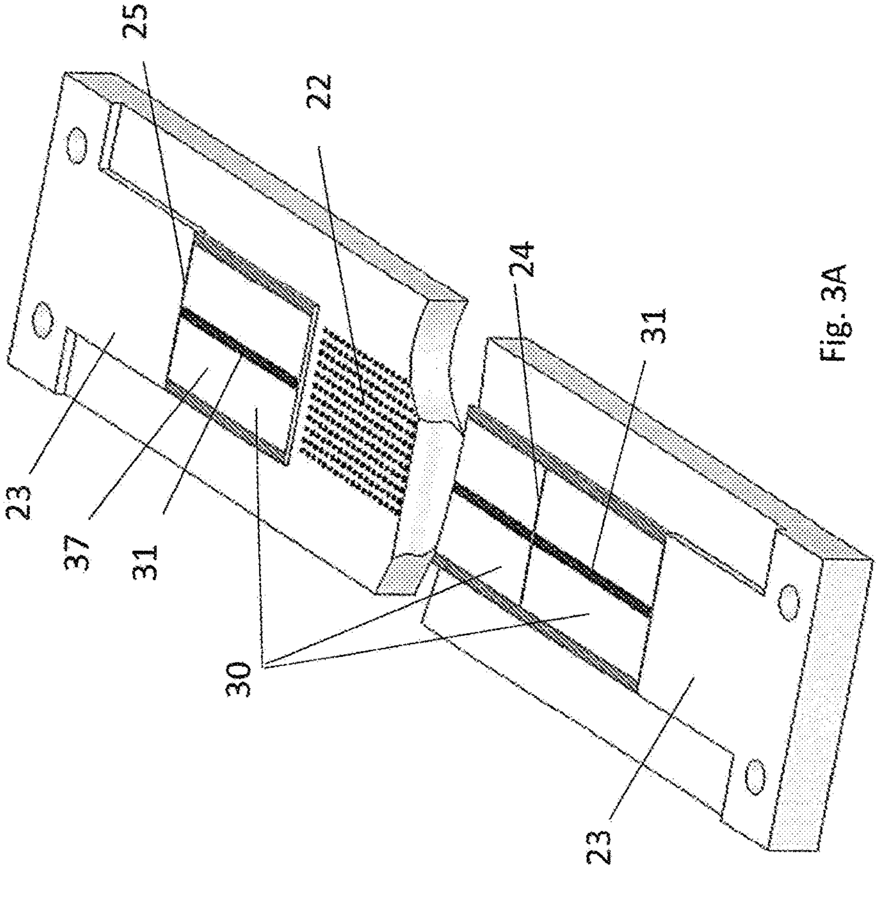
FIG. 3A is a simplified view of the base plate of FIG. 2 with antenna chips installed thereon using ball-grid arrays (BGAs).
Figure 6:
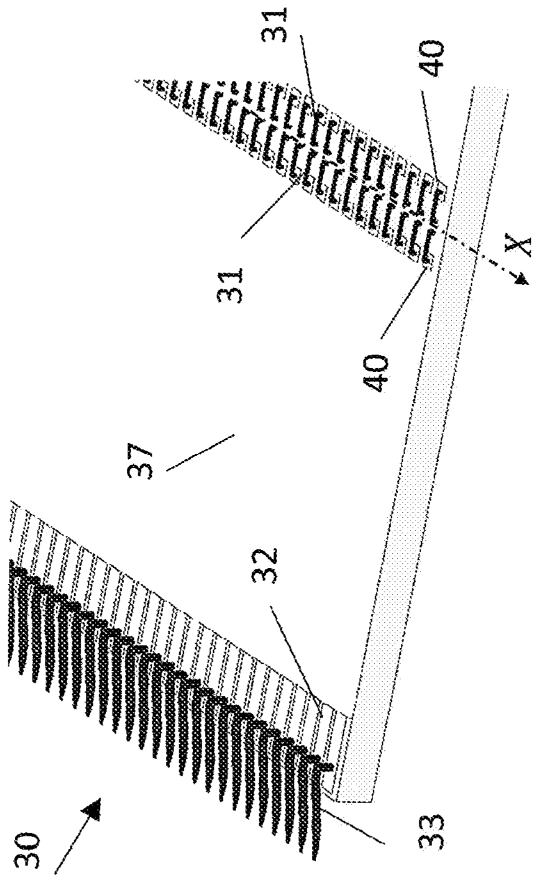
FIG. 6 is simplified view of an antenna chip fragment with two arrays of scatterers and the wire-bond connections between the chip and a control board (not shown).

As shown in FIG. 3A, the upper surfaces of the chips 30 are coplanar with the upper surfaces of the plateaus 23. A metallized layer is advantageously formed on the upper surface of each of the antenna chips 30, as best shown in FIG. 6. The metallized layer is divided by inter-chip gaps 24 and chip-to-plateau gaps 25 to form a ground plane 37 on the upper surface of each of the chips 30. FIG. 3B shows two adjacent antenna chips 30 with their respective ground planes separated by an inter-chip gap 24. The ground planes 37 are electrically connected across the inter-chip gap 24 by conductive links 370, such as wire bonds or wire strips, as shown. Alternatively, the inter-chip gaps 24 may be electrically bridged by continuous solder or conductive epoxy. One particularly advantageous type of link may be provided by virtual short circuits, which can be implemented by a ball grid array (BGA) configuration of the type described below.

Figure 14:
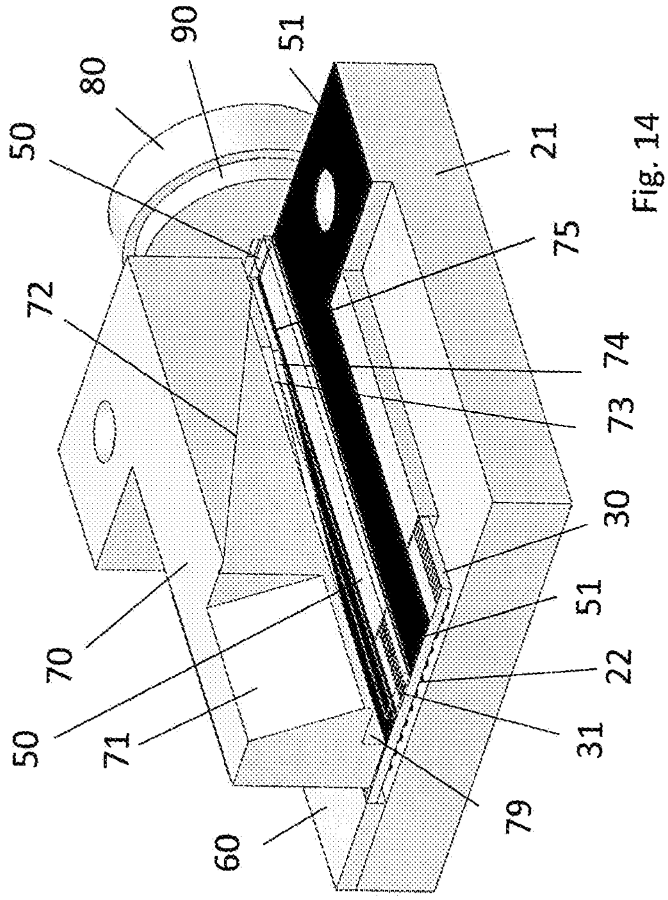
FIG. 14 is simplified cross-sectional view of an antenna feeding end comprising a tapered transition between an antenna horn and an external waveguide.

The antenna 10 is connected at each end to an external waveguide flange 80 through an impedance-matching transformer 90, only one of which is visible in FIGS. 1 and 14. Mounted on the flat central area 21 of the base 20 is a plurality of electrical connectors 62, through which DC power and control signals are provided to the plurality of control circuit boards 60, as will be described below.

Figure 4:
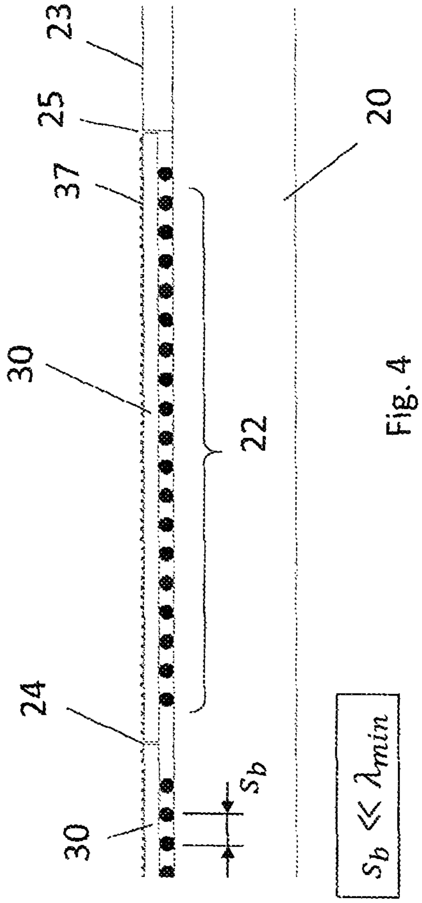
FIG. 4 is a semi-diagrammatic view of the base plate of FIG. 3, showing the BGA geometry and air gaps between adjacent antenna chips and air gaps between the antenna chips and base platforms.
Figure 5:
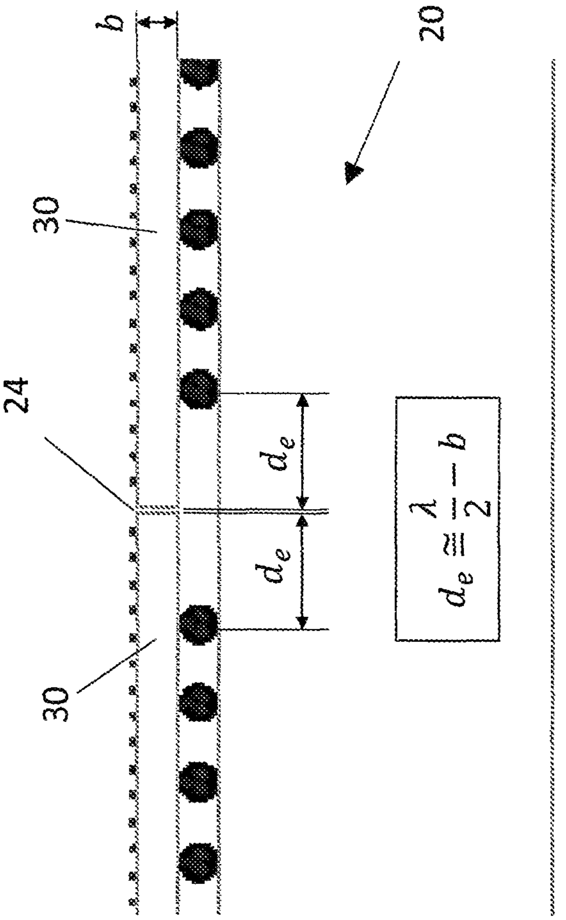
FIG. 5 is a diagrammatic view of a portion of FIG. 4, showing the spacing between adjacent antenna chips and the corresponding spacing between their respective BGAs.

As shown in FIGS. 3A, 4, and 5, according to aspects of this disclosure, the antenna chips 30 may advantageously be attached to the upper planar surface 21 of the base 20 along a longitudinal axis X using ball-grid arrays (BGAs) 22, preferably one BGA 22 per chip 30. The use of the BGAs 22 provides a good parallelism between the base 20 and the ground planes 37, while providing an even leveling of the chips 30 with the plateaus 23. The BGAs 22 also provide good thermal conductivity between the antenna chips 30 (which are heat sources) and the antenna base 20 (which, as mentioned above, may function as a heat sink). The BGAs 22 also provide virtual short circuits between the adjacent ground planes 37 and between each of the plateaus 23 and the adjacent ground planes 37. The virtual short circuits eliminate or minimize parasitic scattering originated in the inter-chip gaps 24 (FIG. 5) and chip-to-plateau gaps 25 (FIG. 3A). To create virtual short circuits, the BGAs 22 should advantageously have the following characteristics:

1) The spacing $s_b$ between the balls in BGAs (FIG. 4) is significantly less than one-half the shortest operational wavelength $\lambda_{min}$ of the antenna:

$$s_b \ll \frac{\lambda_{min}}{2};$$

2) and the distances $d_e$ between the edges of the chips 30 and the corresponding ball-grid array edges (FIG. 5) are selected to be:

$$d_e \cong \frac{\lambda}{2} - b,$$

where b is the chip thickness, and λ is the average (or central) antenna operational wavelength.

The BGAs 22 represent photonic band-gap structures preventing wave coupling and propagation under the chips 30. The gaps 24 and 25, connected at the chip edges by air-filled spaces between the chips 30 and the base 21, function as half-wavelength transmission lines shorted at one end by the corresponding BGA and effectively being shorted (zero voltage and maximal current) at the other end, where the gaps between adjacent ground-plane segments are located.

As shown, for example, in FIG. 6, each antenna chip 30 carries two integrated linear arrays of mutually mirror-symmetric scatterers 31 (metal or metallized), scatterer switches 40, and interface pads 32. Each of the interface pads 32 connects one of the switches 40 to an appropriate control circuit 61 using a wire-bond 33. In the illustrated configuration, the two linear arrays of scatterers 31 and scatterer switches 40 are arranged longitudinally along either side of the longitudinal central axis X defined by a transmission/feed line comprising a linear dielectric element or “rod” 50, which may be configured as a flat strip of rectangular cross section (as shown), or a rod of any other suitable geometry. The interface pads 32 are arranged linearly along each of the opposite longitudinal edges of the antenna chips 30.

Figure 7B:
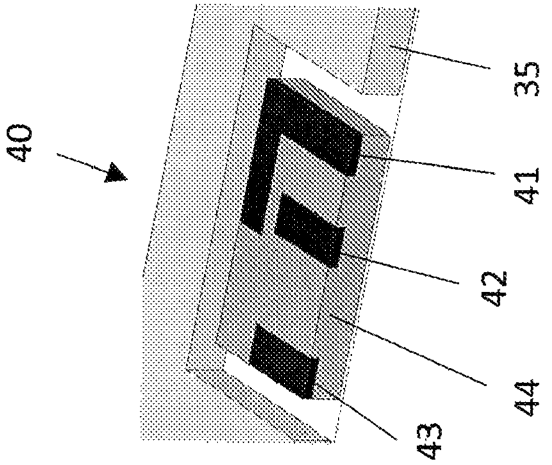
FIG. 7B is a simplified view of a scatterer control switch geometry, with the metallization omitted for clarity.
Figure 7A:
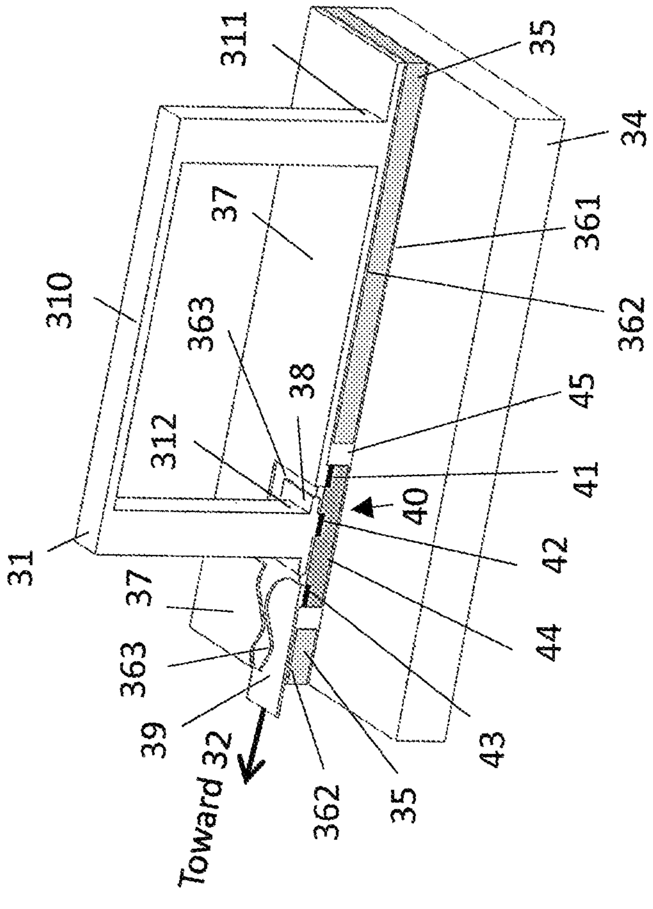
FIG. 7A is simplified cross-section view of a portion of an antenna element, which includes a scatterer and a semiconductor scatterer control switch embedded in the antenna element.

As shown in FIGS. 6, 7A, and 8B-8D, each scatterer 31 may be configured as a H-shaped conductive element (e.g., metal or metal-plated wire), surrounded by air, so as to minimize dielectric losses, as compared to other materials. As best shown in FIG. 7A, each scatterer includes a main portion 310, a first leg 311 connected to an adjacent portion of the ground plane 37, and a second leg 312 connected, via a central contact 38, to a central electrode 42 of a corresponding switch 40. Each of the switches 40 is located in a switch area or pocket 44 formed in a silicon-on-insulator (SOI) device layer 35 on the upper chip surface. Each of the switches 40 also comprises a ground electrode 41 (for which the ground plane 37 is the contact), and a control electrode 43 connected to an interface pad 32 through a metal trace 39 formed from a metallized interconnection layer on the chip 30. The device layer 35 may advantageously be separated from a handle layer 34 by a thin dielectric (e.g., silicon dioxide) layer 361. A dielectric ring 45 (e.g., silicon dioxide) isolates each active switch area or pocket 44 from the rest of the device layer 35 and prevents the carriers injected into the pocket 44 from spreading across the device layer 35. The metal traces 39 may advantageously be embedded between a first dielectric layer 362 and a second dielectric layer 363 under the ground plane 37.

Figures 8A, 8B, 8C, 8D:
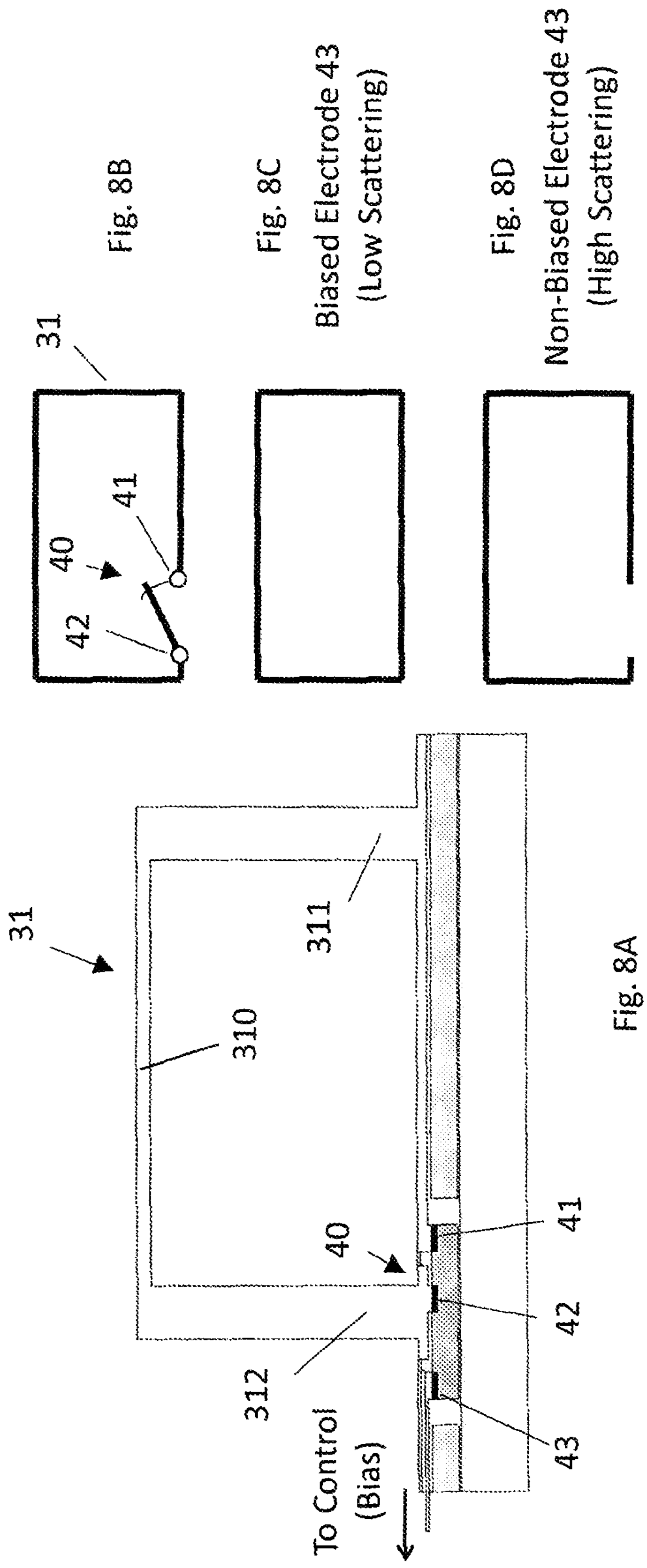
FIG. 8A is another simplified cross-sectional view of the structure shown in FIG. 7A.
FIGS. 8B, 8C, and 8D are schematic diagrams illustrating a scattering equivalent circuit that is switchable between a low scattering state closed loop and a high scattering state open loop.

As shown in FIGS. 7A and 8A, in each switch 40, the ground electrode 41 is connected to the ground plane 37, the central electrode 42 is connected to the second leg 312 of a scatterer 31, and the control electrode 43 is connected, via the metal trace 39, to an interface pad 32, and through a wire-bond 33, to an appropriate control circuit 61 (FIG. 1). (It will be appreciated that each of the control circuits 61 may be electrically connected to one or more of the switches 40.) All three electrodes 41, 42, and 43 are formed by doped pockets in the device layer 35. In one control circuit polarity, the control electrode 43 is doped by acceptors, the ground electrode 41 and the central electrode 42 by donors. With an opposite control circuit polarity, the ground electrode 41 and the central electrode 42 may be doped by acceptors, while the control electrode 43 would be doped by donors. FIG. 7B shows an exemplary geometry of the doped regions forming the ground electrode 41, the central electrode 42, and the control electrode 43.

When the control electrode 43 is biased by a corresponding voltage or current from a control circuit 61 (FIG. 8A), electrons and holes are injected into the pocket 44 through the electrodes 41, 42, and 43. The injected electron-hole plasma connects the central electrode 42 and the ground electrode 41. As the result, the second scatter leg 312 is also connected to the ground plane 37, and the scatter 31 forms a closed loop (FIG. 8C). The length of the scatter 31 is selected such that the corresponding closed loop resonant frequency is sufficiently different from the frequency of the passing (transmitted or received) wave. Thus, the scatterer 31 has a weak effect on the wave, in what may be termed a "low-scatter state." When the control electrode 43 is not biased, the scatterer 31 is open-looped (FIG. 8D), and its resonant frequency is close to the frequency of the passing wave. Therefore, the scatterer 31 effectively scatters energy from the passing wave, in what may be defined as a "high-scatter state." Alternative geometries of the scatterers 31 (for example, different lengths) can yield a reversal of the biased/unbiased states, such that a high scatter state is obtained when a scatterer 31 is grounded at both ends, and a low scatter state is obtained when the scatterer 31 is grounded at only one end. The former arrangement may be preferable, because, in the latter case, a strong RF current through the switch may produce excessive RF losses.

Using linear mirror-symmetric arrays of scatterers 31 and switches 40, as shown in FIG. 6, is optional. Due to the mirror symmetry, the microwave currents generated in low-scattering scatterers in one array have the same values as the currents generated in low-scattering scatterers in the other array, but in the opposite direction. Therefore, the low-scattering scatterers from both arrays form destructive interference, and the parasitic radiation scattered by the low-scattering scatterers in each of the two arrays is thus effectively annihilated by the parasitic radiation scattered by the low-scattering scatterers in the other array. To prevent annihilation of the radiation scattered by the high-scattering scatterers, the biased/unbiased pattern of one array is advantageously shifted relative to the pattern of the other array by a distance equal to a half-period ($P_\Sigma/2$) along the antenna waveguide. Then, due to the additional phase shift, all high-scattering scatterers operate in-phase and form constructive interference. Small relative shifts between two scatterer arrays, such as by a half-space distance s/2, may provide the benefits of more flexible beam-forming for the antenna and better control of quantization lobes. All antenna components are reciprocal, and the antenna forms the same beam shapes (however, in the opposite directions) when the antenna operates in a transmitting mode and a receiving mode, given the same biased/unbiased switch patterns.

Figure 9B:
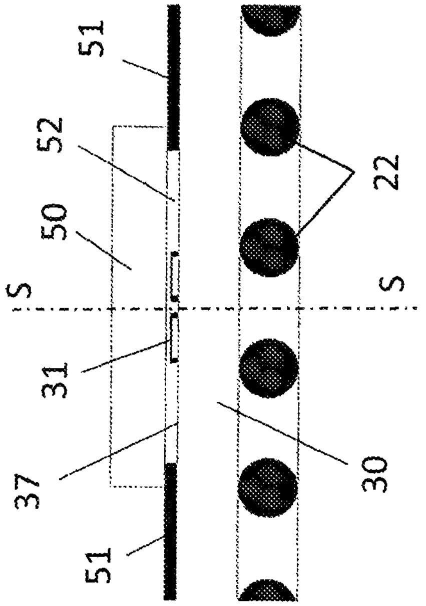
FIG. 9B is a simplified cross-section view of the structure shown in FIG. 9A, showing the scatterers located in an air gap between the dielectric element or rod and the ground plane.
Figure 9C:
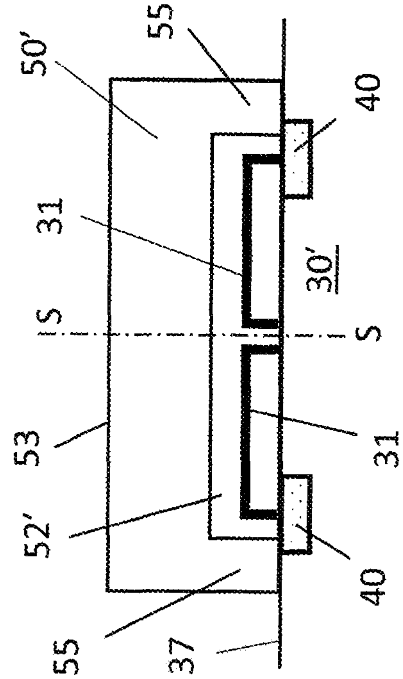
FIG. 9C is a simplified cross-sectional view of another embodiment of a dielectric element or rod in accordance with an aspect of this disclosure.
Figure 9A:
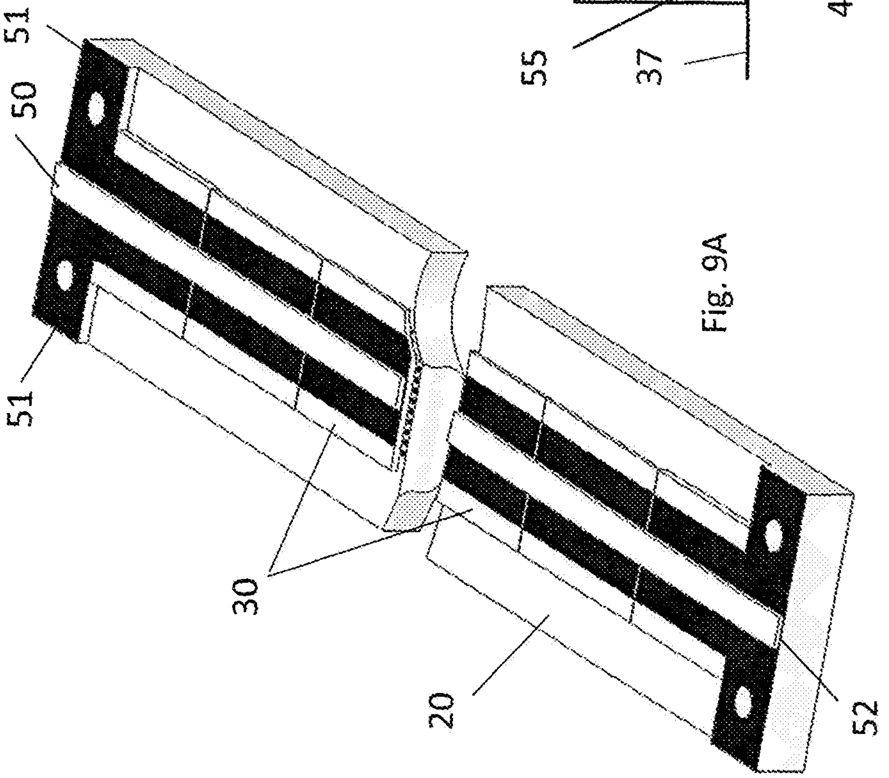
FIG. 9A is a view of the base plate shown in FIG. 3, but with the addition of a dielectric element or rod and metal spacers installed on it.

FIGS. 9A and 9B illustrate a dielectric element or rod 50 of a transmission/feed line, extending along the longitudinal axis X on the upper surfaces of the plurality of antenna chips 30 in accordance with an embodiment of this disclosure. In this embodiment, the dielectric element or rod 50 is configured as a strip or flattened rod of rectangular cross-section with opposed longitudinal edges mounted on a parallel pair of longitudinal metal spacers 51 that are disposed along the opposite longitudinal edges of the ground plane 37, and that extend laterally to the opposite edges of the base 20 at each end thereof. The spacers 51 allow the dielectric element or rod 50 to overlie the scatterers 31 without contacting them, with an air space or gap 52 defined between the dielectric element or rod 50 and the upper surface of the chip 30, as shown in FIG. 9B. The scatterers 31 are thus contained within the air space or gap 52, without contacting the dielectric element or rod 50, which thus overlies the scatterers 31 and is spaced from them by air within the air space or gap 52. The object is to situate the scatterers 31 with respect to the dielectric rod 50 so as to be surrounded by air.

FIG. 9C illustrates a dielectric element or rod 50' in accordance with another embodiment of the disclosure. In place of the spacers 51, the dielectric element or rod 50' is T-shaped, comprising a longitudinal strip 53 having a pair of downwardly-depending extensions or rails 55 extending longitudinally along opposite sides of the strip 53, thereby spacing the strip 53 from the upper surface of the chip 30 so as to create an air space or gap 52' between the strip 53 and the upper surface of the chip 30, with the scatterers 31 situated within the air space 52' so as to be separated by air from all parts of the dielectric rod 50', the object again being to situate the scatterers 31 so as to be surrounded by air.

FIGS. 9A, 9B, and 9C illustrate that the scatterers 31 may optionally be arranged in first and second parallel arrays of scatterers, with the scatterer control switches 40 arranged in corresponding first and second parallel switch arrays. Where first and second arrays of scatterers and switches are used, the first arrays of scatterers 31 and switches 40 are in mirror symmetry with the respective second arrays of scatterers 31 and switches 40 with respect to a longitudinally-extending plane of symmetry S, as shown in FIGS. 9A and 9C. The plane of symmetry S is orthogonal to the surface of the chip 30, and it extends along (that is, includes) the longitudinal axis X.

Microwave energy injected into the antenna 10 through the transformers 90 (transmitting mode) or coupled out to the external waveguide (receiving mode) (see FIG. 1) is channelized (confined) inside a slow-wave waveguide formed by the ground plane 37, the dielectric element or rod 50 or 50', the metal spacers 51 (in the FIG. 9B embodiment), the air channel 52 or 52', and the cover 70 (including the horn 71). The field strength in the air channel 52 or 52' around the scatterers 31 depends on the thickness of the spacer 51 (FIG. 9B embodiment) or the length of the legs or rails 55 of the dielectric strip 50' (FIG. 9C embodiment). Depending on the corresponding switch state (unbiased or biased), the scatterers 31 scatter the propagating wave weakly (biased) or strongly (unbiased). By properly selecting unbiased/biased switch pattern, a coherent beam can be formed with an almost flat phase-front in the required direction.

Figure 10:
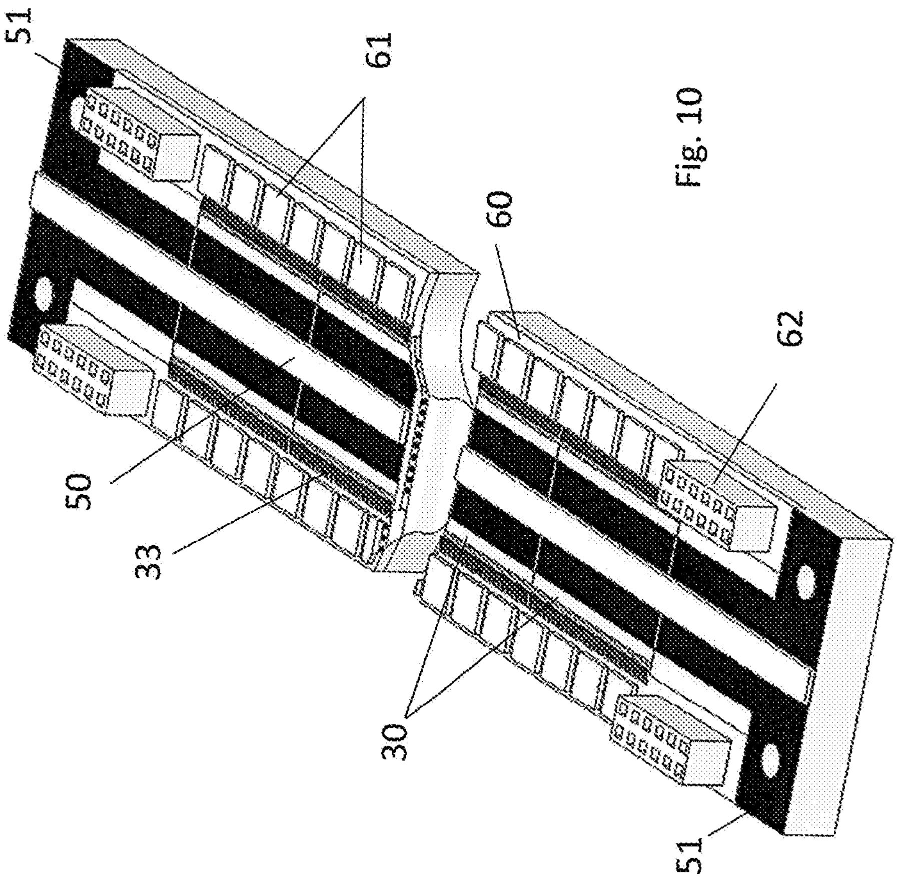
FIG. 10 is a view of the structure of FIG. 9A, but with the addition of control boards, shift-register ICs, signal and power connectors, and arrays of wire-bond connectors between the antenna chips and the boards.

As shown in FIG. 10, the wire-bonds 33 electrically connect the antenna chips 30 to the control boards 60, which carry control or driver circuits 61, preferably implemented as ICs. In other embodiments, the control circuits 61 may be integrated directly into the antenna chips 30. The control or driver circuits 61 may be configured as a set of shift-registers, or, alternatively, as FPGAs (Field-Programmable Gate Arrays) or another type of controlling device. The control or driver circuits 61, in turn, are controlled by signals from a controller (not shown), such as a suitably programmed microprocessor, which is connected to the control boards 60 through the connectors 62. The controller can also be integrated into one or more of the control circuits 61. The same connectors 62 may advantageously be used to provide DC power to the antenna.

The control circuits 61 convert a pulse-stream control signal into parallel outputs that bias the required switches 40 according to the desired pattern. A typical biased/unbiased switch pattern is periodic or quasi-periodic. The average period $P_\Sigma$ determines the scattered beam direction, $$P_\Sigma = \frac{1}{N_P}\sum P_i,$$

where $N_P$ is the number of periods, and $P_i$ are individual periods.

Figure 11A:
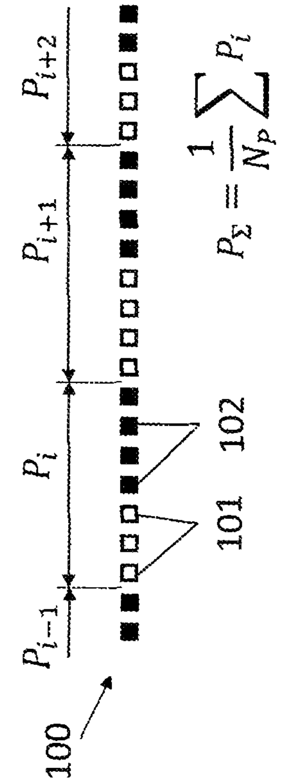
FIGS. 11A and 11B illustrate schematically unbiased/biased switch patterns formed by biased switches and unbiased switches.
Figure 11B:
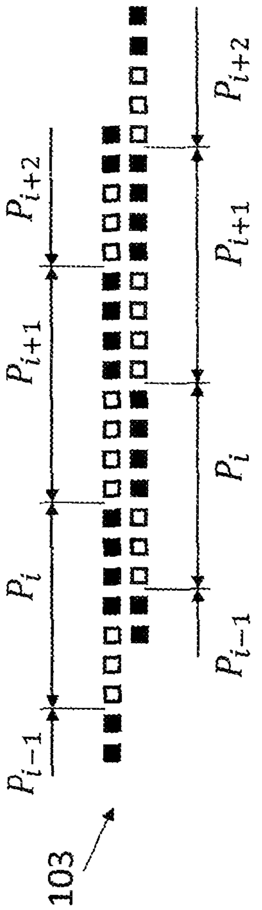

FIG. 11A shows a diagram 100 representing a fragment of a quasi-periodic pattern of unbiased switches 101 and biased switches 102 with average period $P_\Sigma=7.5$. FIG. 11B shows a diagram 103 representing a half-average-period ($P_\Sigma/2$) shift between the switch patterns of the two mirror-symmetric arrays necessary for proper phasing of high-scattering from both scatterer loop arrays.

Figure 12:
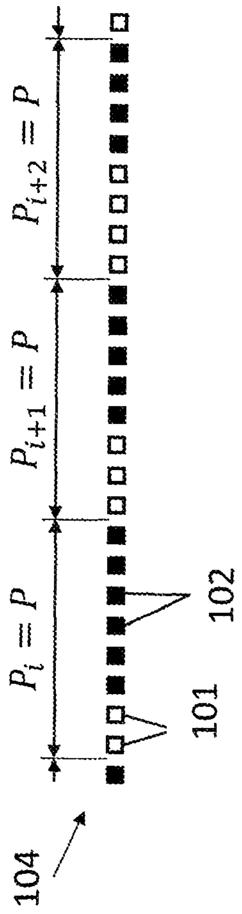
FIG. 12 illustrates schematically an antenna tapering produced by changing the number of unbiased switches and biased switches while preserving their total number in one period. All three shown periods involve the same number of switches, $P_i$=8, while the number of unbiased switches varies from two to four, and, correspondingly, the number of biased switches varies from six to four.

FIG. 12 shows a diagram 104 representing how an antenna taper can be achieved through programming patterns of unbiased/biased switches. The average coupling per period can be controlled by varying the number of unbiased switches without changing the total number of switches per period, i.e., without affecting beam direction. In the diagram 104, all unbiased/biased periods consist of eight switches. The number of couplings per period, however, is different and increases from the left period to the right period, as shown in the figure.

Figure 16:
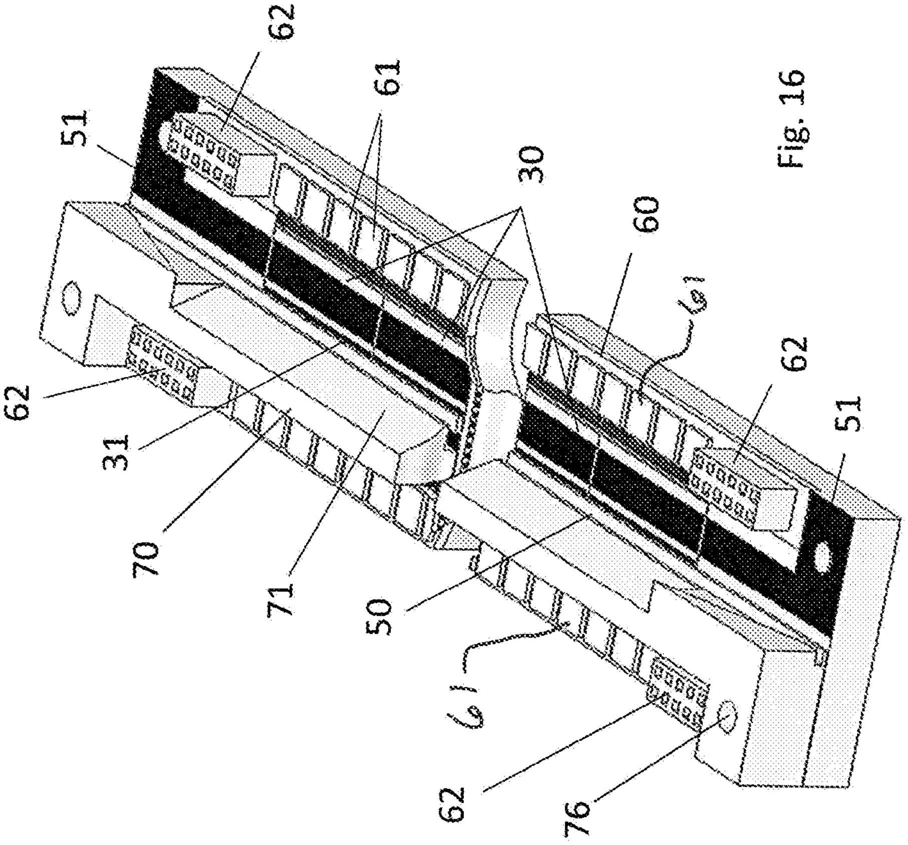
FIG. 16 is a simplified view of the assembled electronically controllable steerable beam antenna in accordance with aspects of the disclosure, showing the major internal components thereof.

As noted above, and as shown in FIGS. 1, 14, and 16, the antenna 10 is advantageously protected by the cover 70 that may advantageously be made of two mirror-symmetric metal or metallized halves. Each of the cover halves may be formed with a longitudinal recess 79 that accommodates the dielectric element or rod 50. Each of the halves of the cover 70 includes a sloped interior surface, whereby the two sloped interior surfaces together define the elongated horn 71 that provides signal coupling between the dielectric element or rod 50 and the ambient environment. The illustrated configuration of the horn 71 is exemplary only, and horns with different profiles, for example, with corrugated or curved walls, may be found advantageous in some applications.

FIG. 14 shows one of the two tapered end-transitions 72 located at the antenna ends. The end-transitions 72 function as matching transformers between the antenna body and an external waveguide. The tapered end transitions 72, along with advantageously-provided tapered features 73 and 74, smoothly transforms the principal antenna mode propagating along the dielectric element or rod 50 (or 50') to the mode propagating in a rectangular external metal waveguide 81 at each end of the antenna. Each tapered end-transition 72 defines an air cavity or void 77, which includes a portion defining a cavity for the dielectric element rod 50 (or 50'), a portion defining a cavity for a matching transformer 91, and a portion defining a cavity for the external metal waveguide 81. The antenna end construction restricts motion of the dielectric element or rod 50 in all directions. Therefore, the dielectric element or rod 50 can be installed in the antenna without the use of an adhesive, which could introduce substantial losses at high frequencies.

Figure 15:
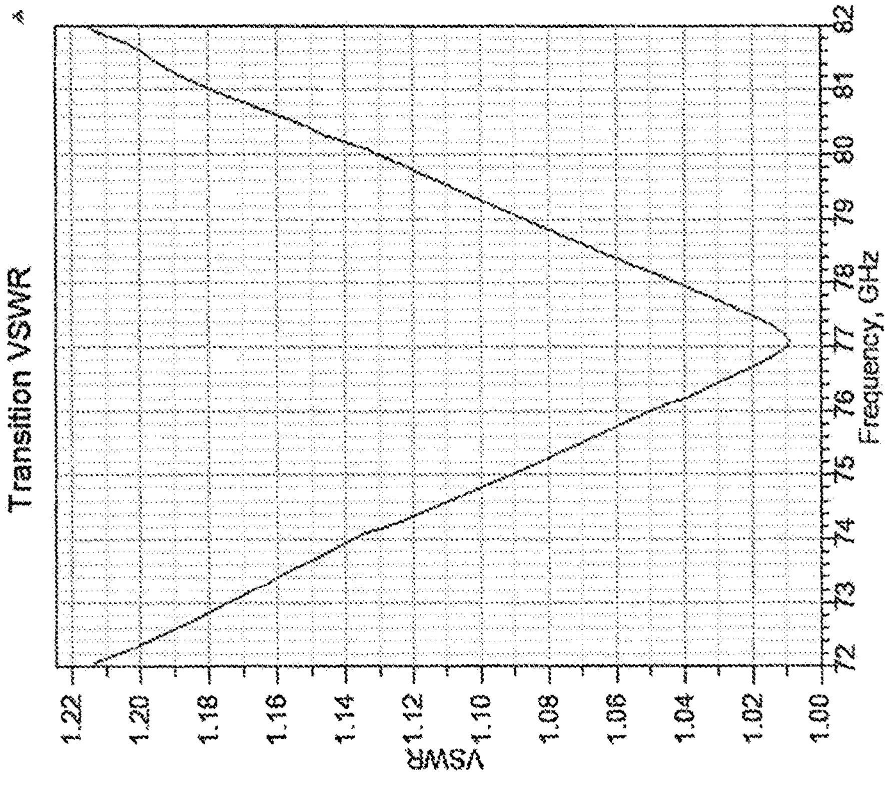
FIG. 15 shows an exemplary HFSS (High Frequency Structure Simulator) VSWR (Voltage Standing-Wave Ratio) for an antenna with the transition shown in FIG. 14. The graph illustrates low reflection losses within a wide frequency range.

Low return losses (VSWR) across a designated scanning range, as may be provided by the end-transition 72, are illustrated graphically in FIG. 15, which represents the results of high frequency structure simulator (HFSS).

Figure 17:
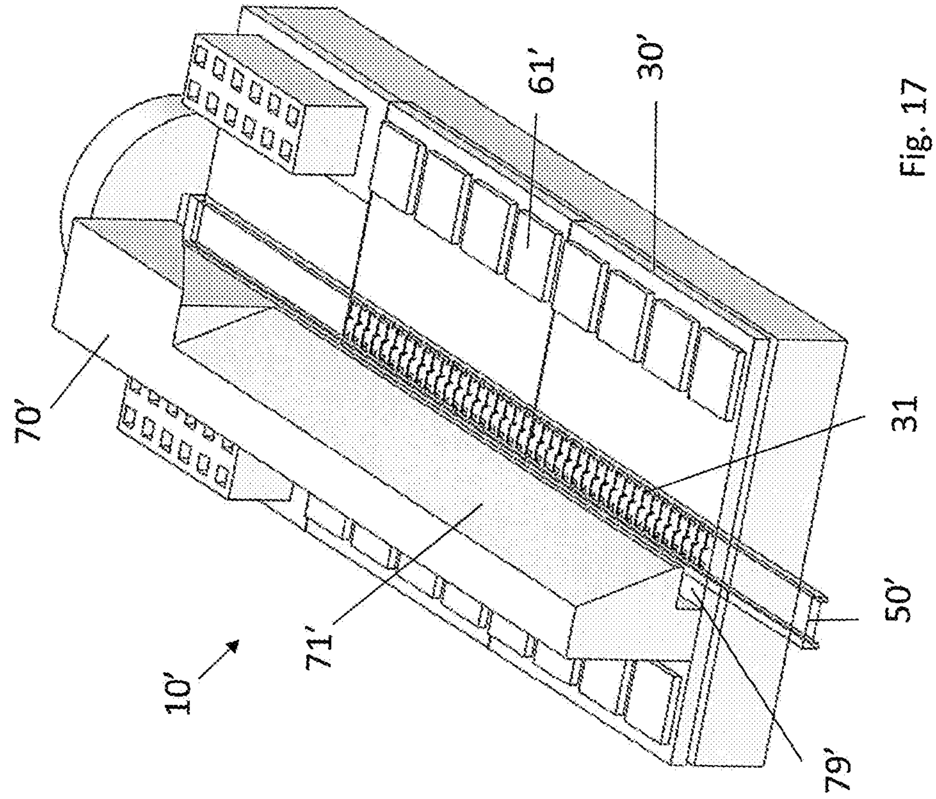
FIG. 17 is a simplified perspective view, partially in cross-section, of a controllable steerable beam antenna in accordance with another embodiment of this disclosure.

FIG. 17 illustrates an antenna 10' that employs a dielectric element or rod 50' in accordance with the embodiment of FIG. 9C. Thus, as illustrated, the antenna 10' lacks the spacers 51 that provides an air gap or channel for the dielectric element or rod 50', instead using the T-shaped dielectric element or rod 50' of FIG. 9C to create the air channel 52' in which the arrays of scatterers 31 are situated. As in the previously-described embodiments, the antenna 10' includes a cover 70' formed of two longitudinal cover halves, each with a sloped interior surface, whereby the sloped surfaces together define a horn 71'. As shown, each of the cover halves includes a longitudinal recess 79' that accommodates the dielectric element 50'. In accordance with this embodiment, control or driver circuits 61' are mounted directly onto the antenna chips 30, using, for example, ball grid arrays (not shown), and the control circuit boards 60 shown in FIG. 1 may therefore be omitted. Each of the cover halves may, in some embodiments, include longitudinal choke channels (not shown) to help to confine the propagating wave inside the waveguide formed by the dielectric element 50 and the cover 70', and to prevent leakage through optional air gaps (not shown) between the cover 70 and the ground planes 37.

From the foregoing description of the structure of a steerable beam antenna in accordance with aspects and embodiments of the disclosure, a method of making an antenna in accordance with this disclosure may include the steps of (a) providing a semiconductor wafer having an upper surface; (b) doping the semiconductor wafer to form a plurality of embedded semiconductor switches, each of the semiconductor switches comprising a ground electrode, a central electrode, and a control electrode; (c) forming an interconnection layer on the semiconductor wafer, wherein the interconnection layer comprises metal traces configured for connecting the control electrode of each of the semiconductor switches with a corresponding control circuit; (d) metallizing the top surface of the semiconductor wafer to form a ground plane, wherein the ground plane is electrically connected to the ground electrode of each of the semiconductor switches; (e) forming a plurality of conductive scatterers on the semiconductor wafer, wherein each of the conductive scatterers electrically connects the central electrode of one of the semiconductor switches to the ground plane, and wherein each of the conductive scatterers has a main portion spaced from the upper surface of the semiconductor wafer; (f) dicing the wafer into a plurality of antenna chips, each of the antenna chips including an array of semiconductor switches and an array of conductive scatterers; (g) installing the plurality of antenna chips onto a base using a ball-grid array for each of the antenna chips; (h) electrically interconnecting each of the installed antenna chips; (i) installing a dielectric element onto the antenna base so as to overlie the array of conductive scatterers on each of the antenna chips, wherein an air gap is provided between the dielectric element and the arrays of conductive scatterers; (j) installing a conductive cover on the base so as to provide a waveguide with the dielectric element; and (k) installing a plurality of control circuits on the base and electrically connecting each of the control circuits to the semiconductor switches in at least one of antenna chips. The step of mounting the chips on the base preferably includes mounting the chips using a ball grid array on each of the chips.

In accordance with one exemplary embodiment of an antenna design in accordance with aspects of this disclosure, a dielectric element or rod 50 with dimensions 50λ×0.75λ×0.11λ is preferably made out of quartz, where λ is the average operational wavelength. The antenna chips 30 are preferably made of SOI wafer with a 20 μm-thick device layer separated from the handle layer by 2 μm-thick silicon oxide. The isolated switch pockets 44, with dimensions 160 μm×130 μm×20 μm, are formed in the device layer by deep-trench etching with consecutive planarization, as is well-known in the art. The switch electrodes are preferably made by phosphorous and boron ion implantation with consecutive annealing, and they have a resistivity below 0.011 cm.

The scatterers 31, ~0.105λ long, are preferably made as wire bonds. Two scatterer arrays 31 are separated by the distance of ~0.025λ. Spacing between the adjacent scatterers in the same array along the dielectric feed 50 is ~0.082λ.

The ball diameter in the ball-grid arrays 22 is 0.4 mm, with a ball spacing of ~0.1λ. The antenna chips 30 are placed on the base surface 21 at a distance ~0.1 mm from each other and from the platforms 23.

The simulated antenna beam patterns for the above-described exemplary embodiment are shown in FIG. 13. The average unbiased/biased switch pattern period $P_\Sigma$ varies between approximately 6.6 s and approximately 10.7 s, where s is the spacing between the adjacent scatterers in the same array. The corresponding scanning angles shown in the graph cover a sector from about −50° through about +10° in the direction toward a single antenna feed point at one end. If the antenna is also fed from a second feed point at the other end, the covered sector will increase correspondingly.

If the unbiased/biased switch patterns can be represented by overlapping patterns with different periods, the antenna generates multiple beams corresponding to the number of the different periods, which can be controlled independently from each other.

For all simulated beam positions excluding 0° and vicinities, the antenna is characterized by low return loss (VSWR<1.2) and high radiation efficiency (exceeding 50%-60%). At the scanning angle 0° and nearby, the Bragg reflection essentially increases the return loss. To minimize the return loss and maximize the antenna radiation efficiency at the Bragg angles, the relative shift between the unbiased/biased switch patterns in the two mirror-symmetric arrays should be optimized by changing it from $P_\Sigma/2$ to 0.75 $P_\Sigma$.

It will be appreciated that the controllable beam antenna embodiments disclosed herein can be adapted to a wide variety of steerable beam antennas, and that antennas employing this feature can be operated to provide steerable beam antennas in different sequences, as will be suitable to different applications and circumstances. It will therefore be readily understood that the specific embodiments and aspects of this disclosure described herein are exemplary only and not limiting, and that a number of variations and modifications will suggest themselves to those skilled in the pertinent arts without departing from the spirit and scope of the disclosure.

What is claimed is:

1. An electronically controlled steerable beam antenna, comprising;

a base having a planar surface;

a plurality of semiconductor antenna chips mounted on the planar surface of the base along a longitudinal axis X, each of the antenna chips defining an upper surface;

a ground plane on the upper surface of each of the antenna chips;

an array of semiconductor switches arranged longitudinally in each of the antenna chips, each of the semiconductor switches comprising a ground electrode, a central electrode, and a control electrode, the control electrode being configured for electrical connection to a control circuit;

an array of conductive scattering elements on each of the plurality of antenna chips, wherein each of the conductive scattering elements comprises a first leg connected to the ground plane, a second leg connected to the central electrode of an associated one of the semiconductor switches, and a main portion extending between the first leg and the second leg, wherein at least the main portion is surrounded by air;

a metal spacer disposed on the ground plane, wherein the spacer extends laterally along the ground plane; and a linear dielectric element mounted on the spacer and the plurality of antenna chips along the longitudinal axis X above the conductive scattering elements, and spaced by an air gap from the conductive scattering elements.

2. The steerable beam antenna of claim 1, wherein each of the antenna chips is mounted on the planar surface of the base by a ball grid array (BGA).

3. The steerable antenna of claim 2, wherein the steerable beam antenna has a minimum operational wavelength, and wherein each of the BGAs comprises an array of conductive balls separated from each other by a spacing that is less than one half the minimum operational wavelength.

4. The steerable beam antenna of claim 3, wherein the steerable beam antenna has an average operational wavelength λ, wherein each antenna chip has a thickness b, wherein each antenna chip has a first edge and the BGA of each antenna chip of the first array of antenna chips has a second edge, and wherein the spacing $d_e$ between the first edge and the second edge is selected to be:

$$d_e \cong \frac{\lambda}{2} - b.$$

5. The steerable beam antenna of claim 1, wherein the array of semiconductor switches is a first array of semiconductor switches and the array of conductive scatterers is a first array of conductive scatterers, the antenna further comprising:

a second array of semiconductor switches and a second array of conductive scattering elements, wherein the second array of semiconductor switches is in mirror-symmetry with the first array of semiconductor switches with the respect to a plane of symmetry, and the second array of conductive scattering elements is in mirror-symmetry with the first array of conductive scattering elements with respect to the plane of symmetry, wherein the plane of symmetry is orthogonal to the upper surface of the antenna chip and comprises the longitudinal axis X.

6. The steerable beam antenna of claim 1, further comprising a cover mounted on the planar surface of the base and defining a waveguide with the dielectric element.

7. An electronically controlled steerable beam antenna, comprising;

a base having a planar surface;

a plurality of semiconductor antenna chips mounted on the planar surface of the base, each of the antenna chips defining an upper surface;

a ground plane on the upper surface of each of the antenna chips;

an array of semiconductor switches in each of the antenna chips, each of the semiconductor switches comprising a ground electrode, a central electrode, and a control electrode;

an array of conductive scattering elements on each of the plurality of antenna chips, wherein each of the conductive scattering elements is connected to the ground plane and to the central electrode of one of the semiconductor switches, wherein each of the scattering elements comprises a main portion extending between a first leg in contact with the central electrode of one of the semiconductor switches and a second leg in contact with the ground plane, and wherein at least the main portion is surrounded by air;

a metal spacer disposed on the ground plane, wherein the spacer extends laterally along the ground plane;

a linear dielectric element mounted on the spacer and the plurality of antenna chips along a longitudinal axis X above the arrays of switches and conductive scattering elements and spaced by an air gap from the conductive scattering elements; and a plurality of control circuits mounted on the planar surface of the base, each of the control circuits being electrically connected to the control electrode of at least one of the semiconductor switches.

8. The steerable beam antenna of claim 7, wherein each of the antenna chips is mounted on the planar surface of the base by a ball grid array (BGA).

9. The steerable antenna of claim 8, wherein the steerable beam antenna has a minimum operational wavelength, and wherein each of the BGAs comprises an array of conductive balls separated from each other by a spacing that is less than one half the minimum operational wavelength.

10. The steerable beam antenna of claim 9, wherein the steerable beam antenna has an average operational wavelength λ, wherein each antenna chip has a thickness b, wherein each antenna chip has a first edge and the BGA of each antenna chip of the first array of antenna chips has a second edge, and wherein the spacing $d_e$ between the first edge and the second edge is selected to be:

$$d_e \cong \frac{\lambda}{2} - b.$$

11. The steerable beam antenna of claim 7, wherein the array of semiconductor switches is a first array of semiconductor switches and the array of conductive scatterers is a first array of conductive scatterers, the antenna further comprising:

a second array of semiconductor switches and a second array of conductive scattering elements, wherein the second array of semiconductor switches is in mirror-symmetry with the first array of semiconductor switches with the respect to a plane of symmetry, and the second array of conductive scattering elements is in mirror-symmetry with the first array of conductive scattering elements with respect to the plane of symmetry, wherein the plane of symmetry is orthogonal to the upper surface of the antenna chip and comprises the longitudinal axis X.

12. The steerable beam antenna of claim 7, further comprising a cover mounted on the planar surface of the base and defining a waveguide with the dielectric element.

13. A method of manufacturing a steerable beam antenna, the method comprising:

(a) providing a semiconductor wafer having an upper surface;

(b) doping the semiconductor wafer to form a plurality of embedded semiconductor switches, each of the semiconductor switches comprising a ground electrode, a central electrode, and a control electrode;

(c) forming an interconnection layer on the semiconductor wafer, wherein the interconnection layer comprises metal traces configured for connecting the control electrode of each of the semiconductor switches with a corresponding control circuit;

(d) metallizing the upper surface of the semiconductor wafer to form a ground plane, wherein the ground plane is electrically connected to the ground electrode of each of the semiconductor switches;

(e) forming a plurality of conductive scatterers on the semiconductor wafer, wherein each of the conductive scatterers electrically connects the central electrode of one of the semiconductor switches to the ground plane, and wherein each of the conductive scatterers has a main portion spaced from the upper surface of the semiconductor wafer;

(f) dicing wafer into a plurality of antenna chips, each of the antenna chips including an array of semiconductor switches and an array of conductive scatterers;

(g) installing the plurality of antenna chips onto a base using a ball-grid array for each of the antenna chips;

(h) electrically interconnecting each of the installed antenna chips and positioning a metal spacer on the ground plane, wherein the spacer extends laterally along the ground plane;

(i) installing a dielectric element onto the ground plane and the antenna base so as to overlie the array of conductive scatterers on each of the antenna chips, wherein an air gap is provided between the dielectric element and the arrays of conductive scatterers;

(j) installing a conductive cover on the base so as to provide a waveguide with the dielectric element; and (k) installing a plurality of control circuits on the base and electrically connecting each of the control circuits to the semiconductor switches in at least one of antenna chips.

* * * * *